United States Patent
Hatano et al.

(10) Patent No.: US 10,494,510 B2
(45) Date of Patent: Dec. 3, 2019

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventors: Seiji Hatano, Kobe (JP); Yuka Yokoyama, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 0 days.

(21) Appl. No.: 15/549,039

(22) PCT Filed: Feb. 15, 2016

(86) PCT No.: PCT/JP2016/054215
§ 371 (c)(1),
(2) Date: Aug. 4, 2017

(87) PCT Pub. No.: WO2016/133030
PCT Pub. Date: Aug. 25, 2016

(65) Prior Publication Data
US 2018/0030248 A1 Feb. 1, 2018

(30) Foreign Application Priority Data
Feb. 19, 2015 (JP) .............................. 2015-030855

(51) Int. Cl.
| C08L 9/00 | (2006.01) |
|---|---|
| B60C 1/00 | (2006.01) |
| C08K 3/36 | (2006.01) |
| C08K 5/548 | (2006.01) |
| C08L 7/00 | (2006.01) |
| C08L 15/00 | (2006.01) |

(52) U.S. Cl.
CPC ..................... *C08L 9/00* (2013.01);
*B60C 1/00* (2013.01); *B60C 1/0016* (2013.01);
*C08K 3/36* (2013.01); *C08K 5/548* (2013.01);
*C08L 7/00* (2013.01); *C08L 15/00* (2013.01)

(58) Field of Classification Search
CPC ..................... C08L 9/00; B60C 1/00
See application file for complete search history.

(56) References Cited

U.S. PATENT DOCUMENTS

| 5,396,940 A * | 3/1995 | Segatta ................. B60C 1/0016 152/209.1 |
|---|---|---|
| 6,479,582 B1 | 11/2002 | Hareyama et al. |
| 2008/0161452 A1 | 7/2008 | York et al. |
| 2008/0161459 A1 | 7/2008 | Cruse et al. |
| 2008/0161460 A1 | 7/2008 | York et al. |
| 2008/0161461 A1 | 7/2008 | Cruse et al. |
| 2008/0161462 A1 | 7/2008 | York et al. |
| 2008/0161463 A1 | 7/2008 | Cruse et al. |
| 2008/0161475 A1 | 7/2008 | York et al. |
| 2008/0161477 A1 | 7/2008 | Cruse et al. |
| 2012/0095153 A1 | 4/2012 | Tokimune et al. |

FOREIGN PATENT DOCUMENTS

| CN | 101631828 A | 1/2010 | |
|---|---|---|---|
| EP | 0943656 A1 | 9/1999 | |
| JP | 10-316802 A | 12/1998 | |
| JP | 2009-91427 A | 4/2009 | |
| JP | 2010-90291 A | 4/2010 | |
| JP | 2010-514765 A | 5/2010 | |
| JP | 2010-514766 A | 5/2010 | |
| JP | 2010-514896 A | 5/2010 | |
| JP | 2010-514897 A | 5/2010 | |
| JP | 2010-514907 A | 5/2010 | |
| JP | 2011-79961 A | 4/2011 | |
| JP | 2012-82325 A | 4/2012 | |
| JP | 2013-227452 A | 11/2013 | |
| JP | 2014-012750 * | 1/2014 | ............... C08L 7/00 |
| JP | 2014-12750 A | 1/2014 | |
| RU | 2266929 C2 | 12/2005 | |
| RU | 2534803 C2 | 12/2014 | |
| WO | 99/16823 A1 | 4/1999 | |
| WO | 03/037655 A1 | 5/2003 | |
| WO | 2008/085450 A2 | 7/2008 | |

OTHER PUBLICATIONS

International Search Report for PCT/JP2016/054215 (PCT/ISA/210) dated May 17, 2016.
Written Opinion of the International Searching Authority for PCT/JP2016/054215 (PCT/ISA/237) dated May 17, 2016.
Machine Translation of JP-2009-91427-A published on Apr. 30, 2009.
Machine Translation of JP-2010-90291-A published on Apr. 22, 2010.
Machine Translation of JP-2011-79961-A published on Apr. 21, 2011.
Machine Translation of JP-2013-227452-A published on Nov. 7, 2013.
Machine Translation of JP-2014-12750-A published on Jan. 23, 2014.

* cited by examiner

*Primary Examiner* — Robert D Harlan
(74) *Attorney, Agent, or Firm* — Birch, Stewart, Kolasch & Birch, LLP

(57) ABSTRACT

Provided are a rubber composition for tires that achieves a balanced improvement in fuel economy, abrasion resistance, and performance on ice, and a pneumatic tire formed from the rubber composition. The present invention relates to a rubber composition for tires containing predetermined amounts of natural rubber, polybutadiene rubber, silica, and a silane coupling agent represented by a specific formula.

10 Claims, No Drawings

RUBBER COMPOSITION FOR TIRE, AND PNEUMATIC TIRE

TECHNICAL FIELD

The present invention relates to a rubber composition for tires and a pneumatic tire.

BACKGROUND ART

In response to the recent demand for fuel efficient tires, rubber compositions incorporating silica have been used in treads and various other tire components. Silica, on the surface of which there are hydrophilic silanol groups, shows lower affinity for the rubber components, particularly natural rubber, polybutadiene rubber, styrene-butadiene rubber, and other rubbers generally used in tires, than carbon black, and thus tends to provide inferior abrasion resistance and mechanical strength (e.g. tensile strength, elongation at break).

Many techniques for solving the above problem have been proposed, such as for example introducing a modifying group reactive with silica into a rubber component, or using a silane coupling agent to increase the interaction between a rubber component and silica. However, common silane coupling agents have only a limited effect on dispersion of silica because, unfortunately, the functional groups in the molecules react with each other and aggregate before the reaction with silica.

Moreover, Patent Literature 1 discloses the use of a highly reactive mercapto silane coupling agent and the combined use of silane coupling agents. Unfortunately, these techniques still have room for improvement in fuel economy or rubber strength. Furthermore, winter tires require grip performance on ice and snow, and the incorporation of a large amount of silica is known to be effective in improving this property. However, this technique has the above-mentioned problems associated with incorporation of silica.

CITATION LIST

Patent Literature

Patent Literature 1: JP 2012-82325 A

SUMMARY OF INVENTION

Technical Problem

The present invention aims to solve the above problems and provide a rubber composition for tires that achieves a balanced improvement in fuel economy, abrasion resistance, and performance on ice, and also provide a pneumatic tire formed from the rubber composition.

Solution to Problem

The present invention relates to a rubber composition for tires, containing:
natural rubber;
polybutadiene rubber;
silica; and
a silane coupling agent represented by the formula (1) below,
the natural rubber and the polybutadiene rubber being present in amounts of 20% by mass or more and 20% by mass or more, respectively, based on 100% by mass of a rubber component in the rubber composition,
the silica being present in an amount of 50 parts by mass or more per 100 parts by mass of the rubber component, $$[Y^1R^1S_x\text{-}]_m[G^1(R^2SiX^1X^2X^3)_a]_n[G^2]_o[R^3Y^2]_p \qquad (1)$$

wherein each $G^1$ independently represents a C1-C30 polyvalent hydrocarbon group containing a polysulfide group, represented by $[(CH_2)_b\text{—}]_cR^4[\text{—}(CH_2)_aS_x\text{—}]_e$;

each $G^2$ independently represents a C1-C30 polyvalent hydrocarbon group containing a polysulfide group, represented by $[(CH_2)_b\text{—}]_cR^5[\text{—}(CH_2)_aS_x\text{—}]_e$;

each of $Y^1$ and $Y^2$ independently represents a silyl group represented by $\text{—}SiX^1X^2X^3$, a hydrogen atom, a carboxyl group, or an ester group represented by $\text{—}C(\text{=}O)OR^6$;

each $X^1$ independently represents —Cl, —Br, —OH, —$OR^6$, or $R^6C(\text{=}O)O$—;

each of $X^2$ and $X^3$ independently represents a hydrogen atom, $R^6$, $X^1$, or a —OSi-containing group formed by silanol condensation;

each of $R^1$ and $R^3$ independently represents a C1-C20 divalent hydrocarbon group;

each $R^2$ independently represents a linear hydrocarbon group represented by $\text{—}(CH_2)_f\text{—}$;

each $R^4$ independently represents a C1-C28 polyvalent hydrocarbon group or a heteroatom-containing C1-C27 polyvalent hydrocarbon group;

each $R^5$ independently represents a C1-C28 polyvalent hydrocarbon group;

$R^6$ represents a C1-C20 monovalent hydrocarbon group; and a, b, c, d, e, f, m, n, o, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, o represents a number of 0 to 10, and x represents a number of 1 to 10.

The silane coupling agent of formula (1) is preferably a compound represented by the following formula:

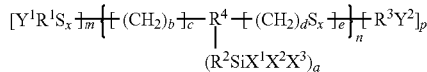

wherein each of $Y^1$ and $Y^2$ independently represents a silyl group represented by —$SiX^1X^2X^3$, a hydrogen atom, a carboxyl group, or an ester group represented by —C(=O)$OR^6$;

each $X^1$ independently represents —Cl, —Br, —OH, —$OR^6$, or $R^6C(\text{=}O)O$—;

each of $X^2$ and $X^3$ independently represents a hydrogen atom, $R^6$, $X^1$, or a —OSi-containing group formed by silanol condensation;

each of $R^1$ and $R^3$ independently represents a C1-C20 divalent hydrocarbon group;

each $R^2$ independently represents a linear hydrocarbon group represented by $\text{—}(CH_2)_f\text{—}$;

each $R^4$ independently represents a cyclic alkyl, alkenyl, alkynyl, aryl, or aralkyl group in which a+c+e−1 hydrogen atoms have been replaced;

$R^6$ represents a C1-C20 monovalent hydrocarbon group; and a, b, c, d, e, f, m, n, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, and x represents a number of 1 to 10.

At least one of the natural rubber or the polybutadiene rubber preferably contains a functional group reactive with silica.

Preferably, the rubber composition further contains at least one selected from the group consisting of sulfide silane coupling agents, liquid coumarone-indene resins, and aluminum hydroxide.

The present invention also relates to a pneumatic tire, formed from the rubber composition.

The present invention also relates a studless winter tire, formed from the rubber composition.

Advantageous Effects of Invention

The rubber composition for tires of the present invention contains predetermined amounts of natural rubber, polybutadiene rubber, silica, and a silane coupling agent represented by the above formula (1). Such a rubber composition achieves a balanced improvement in fuel economy, abrasion resistance, and performance on snow and ice.

DESCRIPTION OF EMBODIMENTS

The rubber composition for tires of the present invention contains predetermined amounts of natural rubber, polybutadiene rubber, silica, and a silane coupling agent of formula (1). In the present invention, by incorporating a specific silane coupling agent into a composition containing large amounts of natural rubber, polybutadiene rubber, and silica, it is possible to efficiently improve the balance of fuel economy, abrasion resistance, and performance on ice and snow as compared to when the silane coupling agent is added to other compositions, thereby synergistically improving the balance of the properties which are usually difficult to simultaneously ensure.

In particular, unlike conventional silane coupling agents, the silane coupling agent of formula (1) is a compound that has a rigid cyclic structure between functional groups interacting with silica or polymers. Thus, the polymers and silica will be properly spaced and fixed so that a balanced improvement in fuel economy and performance on ice can be achieved. Therefore, the balance of the properties can be remarkably improved.

In the present invention, the rubber component includes a large amount of natural rubber (NR). This remarkably improves the balance of the properties.

Any NR may be used including those commonly used in the tire industry, such as SIR20, RSS#3, TSR20, deproteinized natural rubber, and highly purified natural rubber.

Moreover, the NR may be a natural rubber (modified NR) containing a functional group reactive with silica (silica-reactive functional group). This provides excellent fuel economy. The silica-reactive functional group may be any group that is reactive with silica. In view of interaction with silica, the silica-reactive functional group is particularly preferably a silyl group, an amino group, an amide group, a hydroxy group, or an epoxy group. The functional group may be introduced into any site, e.g. the main chain or chain ends of the rubber.

The modified NR may suitably be, for example, epoxidized natural rubber (ENR). The ENR preferably has a degree of epoxidation of 1 to 85 mol %. The degree of epoxidation refers to the ratio of the number of epoxidized carbon-carbon double bonds to the total number of carbon-carbon double bonds in the natural rubber before epoxidation, as determined by, for example, titration analysis or nuclear magnetic resonance (NMR).

The amount of NR based on 100% by mass of the rubber component is 20% by mass or more, preferably 30% by mass or more, more preferably 35% by mass or more. If the amount is less than 20% by mass, rubber strength may decrease, or the cohesion of the rubber compound during kneading may be so poor that productivity can deteriorate. The amount of NR is also preferably 70% by mass or less, more preferably 65% by mass or less. When the amount is more than 70% by mass, performance on ice may deteriorate. When unmodified NR or ENR is incorporated, the suitable amount thereof is within the same range as indicated above.

The rubber composition of the present invention contains a large amount of polybutadiene rubber (BR). This remarkably improves the balance of the properties.

Rubber compounds incorporating BR with silica usually show low dispersibility of filler such as silica and have difficulties in achieving desired properties. In the present invention, the incorporation of the silane coupling agent of formula (1) increases the interaction between silica and the rubber component. Thus, the dispersibility of filler is improved, and a balanced improvement in fuel economy, performance on ice, and abrasion resistance is achieved.

Any BR may be used including those commonly used in the tire industry.

The BR may also be a polybutadiene rubber (modified BR) containing a functional group reactive with silica (silica-reactive functional group). This provides excellent fuel economy. Suitable examples of the silica-reactive functional group include the groups as mentioned above. Similarly, the functional group may be introduced into any site, e.g. the main chain or chain ends of the rubber.

In order to significantly achieve the effects of the present invention, the modified BR may suitably be produced by a method that includes: modification step (A) of performing a modification reaction to introduce an alkoxysilane compound having two or more reactive groups including an alkoxysilyl group into the active terminal of a polybutadiene having an active terminal and a cis-1,4 content of 98.5% by mass or more; and condensation step (B) of performing a condensation reaction of the residual groups of the alkoxysilane compound introduced into the active terminal, in the presence of a condensation catalyst containing at least one element selected from the group consisting of the elements of Groups 4, 12, 13, 14, and 15 of the periodic table, wherein the polybutadiene is obtained by polymerization in the presence of a catalyst composition mainly containing a mixture of the following components (a) to (c):

component (a): a lanthanoid-containing compound that contains at least one element selected from the group consisting of lanthanoids, or a reaction product obtained by reaction between the lanthanoid-containing compound and a Lewis base;

component (b): at least one compound selected from the group consisting of aluminoxanes and organoaluminum compounds represented by the general formula: $AlR^{11}R^{12}R^{13}$ wherein $R^{11}$ and $R^{12}$ are the same as or different from one another and each represent a C1-C10 hydrocarbon group or a hydrogen atom, and $R^{13}$ is the same as or different from $R^{11}$ or $R^{12}$ and represents a C1-C10 hydrocarbon group; and component (c): an iodine-containing compound that contains at least one iodine atom in its molecular structure.

In other words, the modified BR can be produced by performing a modification reaction to introduce an alkoxysilane compound into the active terminal of a polybutadiene having a cis-1,4 content of 98.5% by mass or more, and then performing a condensation reaction of the residual groups of the alkoxysilane compound introduced into the active terminal, in the presence of a condensation catalyst containing at least one of the elements of Groups 4, 12, 13, 14, and 15 of the periodic table.

Modification step (A) is a step of performing a modification reaction to introduce an alkoxysilane compound having two or more reactive groups including an alkoxysilyl group into the active terminal of a polybutadiene having an active terminal and a cis-1,4 content of 98.5% by mass or more. This step may be carried out by known modification methods.

The lanthanoid-containing compound for component (a) may be a known compound, and suitably a neodymium-containing compound. In particular, it is preferably neodymium phosphate or neodymium carboxylate, particularly preferably neodymium versatate or neodymium 2-ethylhexanoate.

Examples of the aluminoxanes and organoaluminum compounds represented by $AlR^{11}R^{12}R^{13}$ for component (b) include known compounds, such as methylalumoxane (hereinafter, also referred to as MAO), ethylalumoxane, n-propylalumoxane, n-butylalumoxane, and isobutylalumoxane; and hydrogenated diisobutylaluminum, triethylaluminum, triisobutylaluminum, and hydrogenated diethylaluminum.

The iodine-containing compound for component (c) may be any compound containing at least one iodine atom in its molecular structure. Examples include, among others, iodinated silicon compounds such as trimethylsilyl iodide; and iodinated hydrocarbon compounds such as methyl iodide, iodoform, and diiodomethane.

The proportions of components (a) to (c) may be appropriately selected as needed. The above-described catalyst may optionally contain, in addition to components (a) to (c), other compounds such as butadiene as needed.

The catalyst composition mainly containing a mixture of components (a) to (c) can be prepared by known methods. The cis-1,4 content of the polybutadiene can be easily adjusted by controlling the polymerization temperature.

The alkoxysilane compound used in modification step (A) (hereinafter, also referred to as "modifier") has two or more reactive groups including an alkoxysilyl group. The type of reactive group other than the alkoxysilyl group is not particularly limited and is preferably at least one functional group selected from the group consisting of an epoxy group, an isocyanate group, a carbonyl group, and a cyano group. The alkoxysilane compound may be in the form of a partial condensate or a mixture of the alkoxysilane compound and the partial condensate.

Specific suitable examples of the alkoxysilane compound that contains an epoxy group (hereinafter, also referred to as "epoxy group-containing alkoxysilane compound") include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane. More preferred among these is 3-glycidoxypropyltrimethoxysilane or 2-(3,4-epoxycyclohexyl)ethyltrimethoxysilane.

Examples of the alkoxysilane compound that contains an isocyanate group (hereinafter, also referred to as "isocyanate group-containing alkoxysilane compound") include 3-isocyanatepropyltrimethoxysilane, 3-isocyanatepropyltriethoxysilane, 3-isocyanatepropylmethyldiethoxysilane, and 3-isocyanatepropyltriisopropoxysilane. Particularly preferred among these is 3-isocyanatepropyltrimethoxysilane.

Examples of the alkoxysilane compound that contains a carbonyl group (hereinafter, also referred to as "carbonyl group-containing alkoxysilane compound") include 3-methacryloyloxypropyltriethoxysilane, 3-methacryloyloxypropyltrimethoxysilane, 3-methacryloyloxypropylmethyldiethoxysilane, and 3-methacryloyloxypropyltriisopropoxysilane. Particularly preferred among these is 3-methacryloyloxypropyltrimethoxysilane.

Examples of the alkoxysilane compound that contains a cyano group (hereinafter, also referred to as "cyano group-containing alkoxysilane compound") include 3-cyanopropyltriethoxysilane, 3-cyanopropyltrimethoxysilane, 3-cyanopropylmethyldiethoxysilane, and 3-cyanopropyltriisopropoxysilane. Particularly preferred among these is 3-cyanopropyltrimethoxysilane.

Condensation step (B) is a step of performing a condensation reaction of the residual groups of the alkoxysilane compound introduced into the active terminal, in the presence of a condensation catalyst containing at least one element selected from the group consisting of the elements of Groups 4, 12, 13, 14, and 15 of the periodic table. The condensation reaction in condensation step (B) may be carried out by known methods.

The condensation catalyst may be a known condensation catalyst containing at least one element selected from the group consisting of the elements of Groups 4, 12, 13, 14, and 15 of the periodic table. For example, it may contain at least one element selected from the group consisting of titanium (Ti) (Group 4), tin (Sn) (Group 14), zirconium (Zr) (Group 4), bismuth (Bi) (Group 15), and aluminum (Al) (Group 13). It is preferably a condensation catalyst containing titanium (Ti), among others, and more preferably an alkoxide, carboxylate, or acetylacetonate complex salt of titanium (Ti).

In order to ensure sufficient low-temperature properties, the BR used in the present invention preferably has a cis content of 70% by mass or more, more preferably 90% by mass or more, still more preferably 97% by mass or more. As used herein, the cis content is determined by infrared absorption spectrum analysis.

The BR preferably has a molecular weight distribution (Mw/Mn) of 1.3 or more, more preferably 1.4 or more. When the Mw/Mn is less than 1.3, processability may deteriorate. The Mw/Mn is preferably 5.0 or less, more preferably 4.0 or less, still more preferably 3.5 or less. When the Mw/Mn is more than 5.0, abrasion resistance tends to deteriorate. In the present invention, the Mn and Mw values are determined by GPC calibrated with polystyrene standards.

In order to achieve required performance on ice and snow and other properties, the amount of BR based on 100% by mass of the rubber component is 20% by mass or more, preferably 30% by mass or more, more preferably 40% by mass or more, still more preferably 50% by mass or more. In view of processability, the amount of BR is also preferably 80% by mass or less, more preferably 70% by mass or less, still more preferably 65% by mass or less. When the modified BR is incorporated, the amount thereof is preferably within the same range as indicated above.

The combined amount of NR and BR based on 100% by mass of the rubber component is preferably 60% to 100% by mass, more preferably 75% to 100% by mass, still more preferably 90% to 100% by mass, and may be 100% by mass. A larger combined amount leads to an efficient improvement in the balance of the properties and therefore a synergistic improvement thereof.

The rubber component may include other rubbers in addition to the natural rubber and the polybutadiene rubber. Examples of other rubbers include styrene butadiene rubber (SBR), styrene isoprene butadiene rubber (SIBR), and butyl rubber (IIR).

A large amount of silica is used in the present invention, which remarkably improves the balance of the properties. Any silica commonly used in the rubber field may be used. Examples include dry silica (anhydrous silicic acid) and wet silica (hydrous silicic acid). Wet silica is preferred because it has a large number of silanol groups. The silica may be used alone or in combinations of two or more.

The silica preferably has a nitrogen adsorption specific surface area ($N_2SA$) of 40 $m^2/g$ or more, more preferably 50 $m^2/g$ or more, still more preferably 100 $m^2/g$ or more, particularly preferably 130 $m^2/g$ or more, most preferably 160 $m^2/g$ or more. When the $N_2SA$ is less than 40 $m^2/g$, tensile strength after vulcanization tends to decrease. The $N_2SA$ of the silica is also preferably 500 $m^2/g$ or less, more preferably 300 $m^2/g$ or less, still more preferably 250 $m^2/g$ or less, particularly preferably 200 $m^2/g$ or less. When the $N_2SA$ is more than 500 $m^2/g$, low heat build-up properties or rubber processability tends to decrease. The nitrogen adsorption specific surface area of the silica is determined by the BET method in conformity with ASTM D3037-81.

The rubber composition of the present invention contains 50 parts by mass or more of silica per 100 parts by mass of the rubber component. This provides excellent performance on ice. The amount of silica is more preferably 60 parts by mass or more. The upper limit of the amount of silica is preferably 200 parts by mass or less, more preferably 150 parts by mass or less. When the amount is more than 200 parts by mass, the silica tends not to disperse sufficiently in rubber, resulting in poor tensile strength or reduced fuel economy.

The rubber composition of the present invention preferably contains carbon black. Any carbon black can be used, including those commonly used in the tire industry, such as GPF, FEF, HAF, ISAF, and SAF. These may be used alone or in combinations of two or more.

The carbon black preferably has a nitrogen adsorption specific surface area ($N_2SA$) of 80 $m^2/g$ or more, more preferably 100 $m^2/g$ or more. When the $N_2SA$ is less than 80 $m^2/g$, weather resistance or antistatic performance may not be sufficiently improved. The $N_2SA$ of the carbon black is preferably 200 $m^2/g$ or less, more preferably 150 $m^2/g$ or less. When the $N_2SA$ is more than 200 $m^2/g$, processability tends to deteriorate. The nitrogen adsorption specific surface area of the carbon black is determined according to the A method specified in JIS K 6217.

The amount of carbon black per 100 parts by mass of the rubber component is preferably 1 part by mass or more, more preferably 3 parts by mass or more. When the amount is less than 1 part by mass, the carbon black may not produce a sufficient improvement effect. The amount of carbon black is also preferably 30 parts by mass or less, more preferably 10 parts by mass or less. When the amount is more than 30 parts by mass, fuel economy or processability tends to deteriorate.

The rubber composition of the present invention may contain aluminum hydroxide. This improves performance on ice. The incorporation of aluminum hydroxide usually tends to lead to a decrease in abrasion resistance due to its weak interaction with the rubber component. However, the use of the silane coupling agent of formula (1) allows for improvement of performance on ice while maintaining abrasion resistance.

The aluminum hydroxide preferably has an average primary particle size of 0.3 µm or more, more preferably 0.4 µm or more. With an average primary particle size of less than 0.3 µm, the aluminum hydroxide is difficult to disperse and thus abrasion resistance tends to decrease. The average primary particle size is also preferably 10 µm or less, more preferably 5 µm or less, still more preferably 3 µm or less. With an average primary particle size of more than 10 µm, the aluminum hydroxide may form fracture nuclei and thus abrasion resistance tends to decrease. In the present invention, the average primary particle size refers to a number average particle size as measured with a transmission electron microscope.

The amount of aluminum hydroxide per 100 parts by mass of the rubber component is preferably 0.1 to 20 parts by mass. When the amount is less than 0.1 parts by mass, performance on ice tends not to be sufficiently improved, while when the amount is more than 20 parts by mass, fuel economy may decrease.

A silane coupling agent (silylated core polysulfide silane) represented by the formula (1) below is used in the present invention.

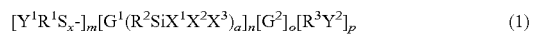

$$[Y^1R^1S_x-]_m[G^1(R^2SiX^1X^2X^3)_a]_n[G^2]_o[R^3Y^2]_p \qquad (1)$$

In the formula, each $G^1$ independently represents a C1-C30 polyvalent hydrocarbon group containing a polysulfide group, represented by $[(CH_2)_b-]_cR^4[-(CH_2)_dS_x-]_e$;

each $G^2$ independently represents a C1-C30 polyvalent hydrocarbon group containing a polysulfide group, represented by $[(CH_2)_b-]_cR^5[-(CH_2)_dS_x-]_e$;

each of $Y^1$ and $Y^2$ independently represents a silyl group represented by $-SiX^1X^2X^3$, a hydrogen atom, a carboxyl group, or an ester group represented by $-C(=O)OR^6$;

each $X^1$ independently represents $-Cl$, $-Br$, $-OH$, $-OR^6$, or $R^6C(=O)O-$;

each of $X^2$ and $X^3$ independently represents a hydrogen atom, $R^6$, $X^1$, or a $-OSi$-containing group formed by silanol condensation;

each of $R^1$ and $R^3$ independently represents a C1-C20 divalent hydrocarbon group;

each $R^2$ independently represents a linear hydrocarbon group represented by $-(CH_2)_f-$;

each $R^4$ independently represents a C1-C28 polyvalent hydrocarbon group or a heteroatom-containing C1-C27 polyvalent hydrocarbon group;

each $R^5$ independently represents a C1-C28 polyvalent hydrocarbon group;

$R^6$ represents a C1-C20 monovalent hydrocarbon group; and a, b, c, d, e, f, m, n, o, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, o represents a number of 0 to 10, and x represents a number of 1 to 10.

The present invention uses the compound of formula (1), and particularly a silylated core polysulfide in which multiple polysulfide chains are oriented in a noncollinear configuration, and the core contains multiple polysulfide groups that are attached to a primary carbon atom. Thus, even though the silane coupling agent contains a group having a high steric hindrance and therefore low reactivity, such as for example a cyclohexyl core, it shows improved reactivity so that the effects of the present invention can be well achieved.

Examples of the divalent hydrocarbon group as $R^1$ or $R^3$ include linear or branched alkylene, alkenylene, arylene, and aralkylene groups. $R^1$ and $R^3$ each preferably have 1 to 5 carbon atoms.

Examples of the polyvalent hydrocarbon group as $R^4$ include cyclic, branched, or linear alkyl, alkenyl, alkynyl, aryl, and aralkyl groups in which a+c+e−1 hydrogen atoms have been replaced. Examples of the heteroatom-containing polyvalent hydrocarbon group as $R^4$ include the above-mentioned polyvalent hydrocarbon groups but containing a heteroatom (e.g. a nitrogen atom, an oxygen atom, a sulfur atom, a phosphorus atom), such as cyclic, branched, or linear polyvalent aliphatic or aromatic hydrocarbon groups containing, for example, an ether group, a polysulfide group, a tertiary amine group, a cyano group, or a cyanurate ($C_3N_3$) group. $R^4$ preferably has 3 to 10 carbon atoms.

Examples of the polyvalent hydrocarbon group as $R^5$ include cyclic, branched, or linear alkyl, alkenyl, alkynyl, aryl, and aralkyl groups in which c+e−1 hydrogen atoms have been replaced. These polyvalent hydrocarbon groups each preferably have 1 to 27 carbon atoms. $R^5$ preferably has 3 to 10 carbon atoms.

Examples of the monovalent hydrocarbon group as $R^6$ include linear or branched alkyl, alkenyl, aryl, and aralkyl groups. $R^6$ preferably has 1 to 5 carbon atoms.

Examples of linear or branched alkyl groups include a methyl group, an ethyl group, a propyl group, and an isobutyl group; examples of linear or branched alkenyl groups include a vinyl group, a propenyl group, an allyl group, and a methallyl group; and examples of linear or branched alkynyl groups include an acetylenyl group, a propargyl group, and a methylacetylenyl group. Examples of aryl groups include a phenyl group and a naphthalenyl group; and examples of aralkyl groups include a benzyl group and a phenethyl group.

Examples of cyclic alkyl, alkenyl, and alkynyl groups include a norbornyl group, a norbornenyl group, an ethylnorbornyl group, an ethylnorbornenyl group, an ethylcyclohexyl group, an ethylcyclohexenyl group, a cyclohexylcyclohexyl group, and a cyclododecatrienyl group.

$Y^1$ and $Y^2$ are defined as above, and each preferably a silyl group represented by $-SiX^1X^2X^3$.

$X^1$ is defined as above, and preferably $-OH$ or $-OR^6$.

Specific examples of $X^1$ include a methoxy group, an ethoxy group, a propoxy group, an isopropoxy group, a butoxy group, a phenoxy group, a benzyloxy group, a hydroxy group, a chloro group, and an acetoxy group.

$X^2$ and $X^3$ are defined as above, and each preferably a group as mentioned as $R^6$ or $X^1$ or a $-OSi$-containing group formed by silanol condensation.

Specific examples of $X^2$ and $X^3$ include a hydrogen atom, a methyl group, an ethyl group, a propyl group, an isopropyl group, a butyl group, a phenyl group, and the above specific examples of $X^1$.

Preferably, a is 1 to 2; b is 1 to 3; c is 1; d is 1 to 3; e is 1; f is 0 to 3; m is 1; n is 1 to 10; o is 0 to 1; p is 1; and x is 1 to 4.

Representative examples of tridentate (trivalent) C1-C30 polyvalent hydrocarbon groups for $G^1$ include $-CH_2(CH_2)_{q+1}CH(CH_2-)-$ or $-CH(CH_3)(CH_2)_qCH(CH_2-)_2$ (in which q is a number of 0 to 20.); $-CH_2CH_2(C_6H_4)CH(CH_2-)-$ or $-CH_2CH_2(C_6H_3-)CH_2CH_2-$ (in which $C_6H_4$ is a disubstituted benzene ring, and $-C_6H_3-$ is a trisubstituted ring.); and $-CH_2(CH-)CH_2CH_2-$, $-CH_2(C-)(CH_3)CH_2CH_2-$, or $-CH_2CH(CH_3)(CH-)CH_2-$. Representative examples of other polyvalent groups include $-CH(CH_2-)(CH_2)_qCH(CH_2-)-$ (in which q is a number of 1 to 20.); $-CH_2(CH-)(C_6H_4)CH(CH_2-)-$ (in which $C_6H_4$ is a disubstituted benzene ring.); and $-CH_2(CH-)CH_2OCH_2CH(CH_2-)-$ or $-CH_2(CH-)(CH-)CH_2-$.

Representative examples of bidentate (divalent) C1-C30 polyvalent hydrocarbon groups for $G^2$ include $-CH_2(CH_2)_{q+1}CH_2(CH_2-)-$ or $CH_2(CH_3)(CH_2)_qCH(CH_2-)_2$ (in which q is a number of 0 to 20.); $-CH_2CH_2(C_6H_4)CH_2CH_2-$ (in which $C_6H_4$ is a disubstituted benzene ring.); and $-CH_2CH_2CH_2CH_2-$, $-CH_2(CH)(CH_3)CH_2CH_2-$, or $-CH_2CH(CH_3)CH_2CH_2-$. Representative examples of other polyvalent groups include tridentate (trivalent) groups such as $-CH_2(CH_2)_v$al$(CH_2-)-$ (in which q is a number of 0 to 20.).

The silane coupling agent of formula (1) is preferably a compound represented by the following formula:

$$[Y^1R^1S_x\underset{m}{]}\underset{}{[}(CH_2)_b\underset{c}{]}R^4\underset{}{[}(CH_2)_dS_x\underset{e}{]}\underset{n}{]}R^3Y^2]_p$$
$$(R^2SiX^1X^2X^3)_a$$

wherein each of $Y^1$ and $Y^2$ independently represents a silyl group represented by $-SiX^1X^2X^3$, a hydrogen atom, a carboxyl group, or an ester group represented by $-C(=O)OR^6$;

each $X^1$ independently represents $-Cl$, $-Br$, $-OH$, $-OR^6$, or $R^6C(=O)O-$;

each of $X^2$ and $X^3$ independently represents a hydrogen atom, $R^6$, $X^1$, or a $-OSi$-containing group formed by silanol condensation;

each of $R^1$ and $R^3$ independently represents a C1-C20 divalent hydrocarbon group;

each $R^2$ independently represents a linear hydrocarbon group represented by $-(CH_2)_f-$;

each $R^4$ independently represents a cyclic alkyl, alkenyl, alkynyl, aryl, or aralkyl group in which a+c+e−1 hydrogen atoms have been replaced;

$R^6$ represents a C1-C20 monovalent hydrocarbon group; and a, b, c, d, e, f, m, n, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, and x represents a number of 1 to 10.

Specific examples of the silane coupling agent of formula (1) include 4-(2-triethoxysilyl-1-ethyl)-1,2-bis-(13-triethoxysilyl-3,4,5,6-tetrathiatridecyl)cyclohexane; 4-(2-triethoxysilyl-1-ethyl)-1,2-bis-(13-triethoxysilyl-3,4,5,6-tetrathiatridecyl)cyclohexane; 4-(2-diethoxymethylsilyl-1-ethyl)-1,2-bis-(13-triethoxysilyl-3,4,5,6-tetrathiatridecyl)cyclohexane; 4-(2-triethoxysilyl-1-ethyl)-1,2-bis-(10-triethoxysilyl-3,4,5,6,7-pentathiadecyl)cyclohexane; 1-(2-triethoxysilyl-1-ethyl)-2,4-bis-(10-triethoxysilyl-3,4,5,6,7-pentathiadecyl)cyclohexane; 4-(2-triethoxysilyl-1-ethyl)-1,2-bis-(9-triethoxysilyl-3,4,5,6-tetrathianonyl)cyclohexane; 1-(2-triethoxysilyl-1-ethyl)-2,4-bis-(9-triethoxysilyl-3,4,5,6-tetrathianonyl)cyclohexane; 2-(2-triethoxysilyl-1-ethyl)-1,4-bis-(9-triethoxysilyl-3,4,5,6-tetrathianonyl)cyclohexane; 4-(2-triethoxysilyl-1-ethyl)-1,2-bis-(8-triethoxysilyl-3,4,5-trithiaoctyl)cyclohexane; 1-(2-triethoxysilyl-1-ethyl)-2,4-bis-(8-triethoxysilyl-3,4,5-trithiaoctyl)cyclohexane; 2-(2-triethoxysilyl-1-ethyl)-1,4- bis-(8-triethoxysilyl-3,4,5-trithiaoctyl)cyclohexane; 4-(2-triethoxysilyl-1-ethyl)-1,2-bis-(7-triethoxysilyl-3,4-dithiaheptyl)cyclohexane; 2-(2-triethoxysilyl-1-ethyl)-1,4-bis-(7-triethoxysilyl-3,4-dithiaheptyl)cyclohexane; 1-(2-triethoxysilyl-1-ethyl)-2,4-bis-(7-triethoxysilyl-3,4-dithiaheptyl)cyclohexane; 2-(2-triethoxysilyl-1-ethyl)-1-(7-triethoxysilyl-3,4-dithiaheptyl)-2-(8-triethoxysilyl-3,4,5-trithiaoctyl)-cyclohexane; 4-(2-triethoxysilyl-1-ethyl)-1,2-bis-(9-triethoxysilyl-3,4,5,6-tetrathianonyl)benzene; bis-[2-[4-(2-triethoxysilyl-1-ethyl)-2-(9-triethoxysilyl-3,4,5,6-tetrathianonyl)cyclohexyl]ethyl]tetrasulfide; bis-[2-[4-(2-triethoxysilyl-1-ethyl)-2-(9-triethoxysilyl-3,4,5,6-tetrathianonyl)cyclohexyl]ethyl]trisulfide; bis-[2-[4-(2-triethoxysilyl-1-ethyl)-2-(9-triethoxysilyl-3,4,5,6-tetrathianonyl)cyclohexyl]ethyl]disulfide; bis-[2-[4-(2-triethoxysilyl-1-ethyl)-2-(7-triethoxysilyl-3,4-dithiaheptyl)cyclohexyl]ethyl]disulfide; bis-[2-[4-(2-triethoxysilyl-1-ethyl)-2-(7-triethoxysilyl-3,4-dithiaheptyl)cyclohexyl]ethyl]trisulfide; bis-[2-[4-(2-triethoxysilyl-1-ethyl)-2-(7-triethoxysilyl-3,4-dithiaheptyl)cyclohexyl]ethyl]tetrasulfide; bis-[2-[4-(2-triethoxysilyl-1-ethyl)-2-(9-triethoxysilyl-3,4,5,6-tetrathianonyl)phenyl]ethyl]tetrasulfide; bis-[2-[4-(2-triethoxysilyl-1-ethyl)-3-bis-(9-triethoxysilyl-3,4,5,6-tetrathianonyl)cyclohexyl]ethyl]-trisulfide; bis[2-[4-(2-diethoxymethylsilyl-1-ethyl)-2-(7-triethoxysilyl-3,4-dithiaheptyl)cyclohexyl]ethyl]disulfide; and any isomer of the foregoing. These may be used alone or in combinations of two or more.

Preferred among these are (2-triethoxysilylethyl)-bis-(7-triethoxysilyl-3,4-dithiaheptyl)cyclohexane, (2-triethoxysilylethyl)-bis-(7-triethoxysilyl-3,4,5,6-tetrathianonyl)cyclohexane, and any isomer thereof.

The silane coupling agent of formula (1) may be produced by, for example, a method that includes: step (a) of reacting a hydrosilane represented by $HSi(X^1X^2X^3)$ (where $X^1$, $X^2$, and $X^3$ are defined as above) with a hydrocarbon containing a reactive double bond; step (b) of reacting a compound obtained in step (a) with a sulfurizing agent represented by $R^6C(=O)SH$ (where $R^6$ is defined as above) in the presence of a free radical agent; step (c) of deblocking the mercapto group using a proton donor; step (d) of reacting a mercaptan obtained in step (c) with a mixture of a base and sulfur; and step (e) of reacting a compound obtained in step (d) with a substituted or unsubstituted hydrocarbon containing a chlorine, bromine, or iodine leaving group.

The hydrocarbon containing a reactive double bond in step (a) may be, for example, a compound represented by the following formula:

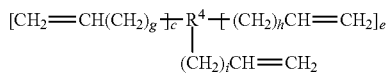

wherein $R^4$, c, and e are defined as above; g represents a number of 0 to 3; h represents a number of 0 to 3; and i represents a number of 0 to 3.

The free radical agent may be an oxidizing agent, for example, a compound that can convert a thiocarboxylic acid to a thiocarboxylic acid radical represented by the formula below. Oxygen, peroxides, hydroperoxides, and other similar substances may also be used.

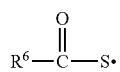

The proton donor may be any hydrogen-containing heterocarbon or substituted heterocarbon that is capable of reacting with a thiocarboxylic acid ester intermediate in step (c) to forma deblocked mercaptan. Examples include alcohols such as methanol, ethanol, isopropyl alcohol, and propanol; amines such as ammonia, methylamine, propylamine, and diethanolamine; and mercaptans such as propyl mercaptan and butyl mercaptan.

The substituted or unsubstituted hydrocarbon containing a leaving group may be a compound represented by $Y^1R^1Z$ or $Y^2R^3Z$ wherein $Y^1$, $Y^2$, and $R^3$ are defined as above, and each Z independently represents Cl, Br, or I.

The reactions may be carried out in the presence or absence of an organic solvent such as alcohol, ether, or hydrocarbon solvents. Examples of the organic solvent include ethanol, methanol, isopropyl alcohol, tetrahydrofuran, diethyl ether, hexane, cyclohexane, toluene, and xylene.

In the rubber composition of the present invention, the amount of the silane coupling agent of formula (1) per 100 parts by mass of silica is preferably 1.0 part by mass or more, more preferably 5.0 parts by mass or more, still more preferably 7.0 parts by mass or more. When the amount is less than 1.0 part by mass, the silane coupling agent may insufficiently react with filler, thereby failing to exert the excellent processability-improving effect. The amount is preferably 30 parts by mass or less, more preferably 20 parts by mass or less, still more preferably 15 parts by mass or less. An amount of more than 30 parts by mass may not further improve the effect of dispersing silica, which can be disadvantageous in cost.

The silane coupling agent of formula (1) may be used in combination with other silane coupling agents, preferably, for example, sulfide group-containing silane coupling agents (polysulfide silanes).

Examples of sulfide group-containing silane coupling agents include bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-triethoxysilylpropyl methacrylate monosulfide, and 3-trimethoxysilylpropyl methacrylate monosulfide. These coupling agents are commercially available generally as mixtures with certain distributions, and suitable examples include Si75 and Si69 both available from Evonik.

When other silane coupling agents are used in combination, the preferred range of the total amount of silane coupling agents is as described above.

In the present invention, usually a vulcanizing agent and a vulcanization accelerator are incorporated. Any vulcanizing agent and vulcanization accelerator may be used, including those commonly used in the tire industry.

In order to well achieve the effects of the present invention, the vulcanizing agent is preferably sulfur, more preferably powdered sulfur, and may be a combination of sulfur with other vulcanizing agents. Examples of other vulcanizing agents include sulfur-containing vulcanizing agents such as Tackirol V200 available from Taoka Chemical Co., Ltd., DURALINK HTS (sodium hexamethylene-1,6-bisthiosulfate dihydrate) available from Flexsys, and KA9188 (1,6-bis(N,N'-dibenzylthiocarbamoyldithio)hexane) available from Lanxess; and organic peroxides such as dicumyl peroxide.

The amount of the vulcanizing agent per 100 parts by mass of the rubber component is preferably 0.1 parts by mass or more, more preferably 0.5 parts by mass or more, but preferably 15 parts by mass or less, more preferably 5 parts by mass or less. When the amount is within the range indicated above, the effects of the present invention can be well achieved, and good tensile strength, abrasion resistance, and heat resistance can also be obtained.

Preferred examples of the vulcanization accelerator are guanidines, sulfenamides, thiazoles, thiurams, dithiocarbamates, thioureas, and xanthates. Although these vulcanization accelerators may be used alone, two or more of these are desirably used in combination according to the intended use. In view of the balance between fuel economy and other rubber properties, it is desirable to use at least a guanidine vulcanization accelerator, among others.

Examples of the guanidine vulcanization accelerator include 1,3-diphenylguanidine, 1,3-di-ortho-tolylguanidine, 1-ortho-tolylbiguanide, di-ortho-tolylguanidine salts of dicatechol borate, 1,3-di-ortho-cumenylguanidine, 1,3-di-ortho-biphenylguanidine, and 1,3-di-ortho-cumenyl-2-propionylguanidine. Particularly preferred among these are 1,3-diphenylguanidine, 1,3-di-ortho-tolylguanidine, and 1-ortho-tolylbiguanide because of their high reactivity.

The amount of the vulcanization accelerator per 100 parts by mass of the rubber component is preferably 0.1 to 5 parts by mass, more preferably 0.2 to 4 parts by mass.

The rubber composition of the present invention preferably contains a plasticizer such as oil, liquid polymers, or liquid resins. This improves processability and enhances rubber strength. One or two or more of these plasticizers may be incorporated.

Among the above plasticizers, it is preferred to incorporate a liquid resin in order to simultaneously ensure fuel economy and abrasion resistance. Suitable examples of the liquid resin include those having a softening point close to room temperature, such as liquid coumarone-indene resins, liquid terpene resins, liquid styrene resins, and liquid C5 resins; and mixtures or modified products thereof. Liquid coumarone-indene resins are particularly preferred in view of the balance between fuel economy and abrasion resistance. From an environmental standpoint, it is preferred to incorporate no plasticizer including a polycyclic aromatic (PCA) component. The liquid resin preferably has a softening point of 0° C. or higher, more preferably a softening point of 5° C. to 40° C. The softening point of the liquid resin is determined as set forth in JIS K 6220-1:2001 with a ring and ball softening point measuring apparatus and is defined as the temperature at which the ball drops down.

The amount of the plasticizer per 100 parts by mass of the rubber component is preferably 2 parts by mass or more, more preferably 5 parts by mass or more. When the amount is less than 2 parts by mass, the effect of improving processability may be insufficient. The amount is also preferably 60 parts by mass or less, more preferably 50 parts by mass or less, still more preferably 40 parts by mass or less. When the amount is more than 60 parts by mass, the burden on the process may increase. In the case where the rubber component is oil extended, the amount of the plasticizer does not include the amount of the oil extender.

The rubber composition of the present invention preferably contains an antioxidant.

Any antioxidant usually used in rubber compositions, such as heat-resistant antioxidants and weather-resistant antioxidants, may be used. Examples include: amine antioxidants such as naphthylamine antioxidants (e.g. phenyl-α-naphthylamine), diphenylamine antioxidants (e.g. octylated diphenylamine, 4,4'-bis(α,α'-dimethylbenzyl)-diphenylamine), and p-phenylenediamine antioxidants (e.g. N-isopropyl-N'-phenyl-p-phenylenediamine, N-(1,3-dimethylbutyl)-N'-phenyl-p-phenylenediamine, N,N'-di-2-naphthyl-p-phenylenediamine); quinoline antioxidants such as 2,2,4-trimethyl-1,2-dihydroquinoline polymer; and phenolic antioxidants such as monophenolic antioxidants (e.g. 2,6-di-t-butyl-4-methyl phenol, styrenated phenols) and bis-, tris-, or polyphenolic antioxidants (e.g. tetrakis-[methylene-3-(3' 5'-di-t-butyl-4'-hydroxyphenyl)-propionate]methane).

The amount of the antioxidant per 100 parts by mass of the rubber component is preferably 1 part by mass or more. When the amount is less than 1 part by mass, the effect of reducing molecular chain scission may be insufficient and thus abrasion resistance may decrease. The amount is also preferably 10 parts by mass or less. When the amount is more than 10 parts by mass, the antioxidant may bloom, causing discoloration.

In addition to the above-described materials, the rubber composition of the present invention may appropriately contain various materials commonly used in the tire industry, such as zinc oxide, stearic acid, and wax.

The rubber composition of the present invention may be prepared by known methods, such as for example by kneading the components using a rubber kneading machine such as an open roll mill or a Banbury mixer, and vulcanizing the mixture.

The rubber composition is usually prepared by a method including: base kneading step 1 of kneading a rubber component, a filler including silica, a silane coupling agent, and other materials; final kneading step 2 of kneading a mixture obtained in base kneading step 1, a vulcanizing agent, and a vulcanization accelerator; and vulcanization step 3 of vulcanizing a mixture obtained in final kneading step 2.

Base kneading step 1 may be divided into, for example, first kneading step 1-1 and second base kneading step 1-2, as needed. The kneading in divided steps improves the dispersibility of silica.

The maximum temperature during the kneading in base kneading step 1 (e.g. base kneading steps 1-1 and 1-2) is not particularly limited, but is preferably 130° C. or higher, more preferably 140° C. or higher, still more preferably 145° C. or higher, in order to sufficiently react the silane coupling agent with silica to efficiently obtain a kneadate in which silica is well dispersed. Also, in order to prevent rubber scorch, the upper limit is preferably 200° C. or lower.

The kneading time in base kneading step 1 (e.g. base kneading steps 1-1 and 1-2) is not particularly limited. In order to efficiently obtain a kneadate in which silica is well dispersed, the kneading time in each step is preferably 3 minutes or longer, more preferably 4 minutes or longer, still more preferably 4.5 minutes or longer, but preferably 9 minutes or shorter, more preferably 8 minutes or shorter, still more preferably 7 minutes or shorter.

In particular, after the kneading temperature reaches 140° C. or higher in the final stage of base kneading step 1 (e.g. base kneading steps 1-1 and 1-2), the kneadate is preferably kept at 140° C. to 190° C. for 10 to 120 seconds. This allows the reaction between the silane coupling agent and silica to completely proceed.

The amount of the silane coupling agent to be introduced in base kneading step 1 (e.g. base kneading steps 1-1 and 1-2) per 100 parts by mass of silica introduced in each step is preferably 1.0 part by mass or more, more preferably 5.0 parts by mass or more, still more preferably 7.0 parts by mass or more. The amount of the silane coupling agent is also preferably 30 parts by mass or less, more preferably 20 parts by mass or less, still more preferably 15 parts by mass or less.

In the case where aluminum hydroxide is introduced, the amount of the silane coupling agent is preferably calculated per 100 parts by mass of the combined amount of aluminum hydroxide and silica introduced.

In final kneading step 2, the kneadate obtained in base kneading step 1 is cooled and then kneaded with a vulcanization system such as a vulcanizing agent and a vulcanization accelerator to obtain an unvulcanized rubber composition. The kneadate obtained in step 1 is usually cooled at 100° C. or lower, preferably at 20° C. to 80° C.

The kneading temperature in final kneading step 2 is preferably 110° C. or lower, more preferably 100° C. or lower. When the temperature is higher than 110° C., rubber scorch may occur. The lower limit of the kneading temperature is not particularly limited, but is preferably 80° C. or higher.

The kneading time in final kneading step 2 is not particularly limited, but is usually 30 seconds or more, preferably 1 to 30 minutes.

Although the antioxidant may be divided into portions for each step and introduced in each step, the entire amount of the antioxidant is preferably introduced in final kneading step 2 in view of workability and from the standpoint of preventing the reduction in activity of the antioxidant during kneading.

In vulcanization step 3, the unvulcanized rubber composition obtained in final kneading step 2 can be vulcanized by a known method to obtain a rubber composition of the present invention. The vulcanization temperature in vulcanization step 3 is preferably 120° C. or higher, more preferably 140° C. or higher, but preferably 200° C. or lower, more preferably 180° C. or lower, in order to well achieve the effects of the present invention.

The rubber composition of the present invention may be used for various tire components and especially suitable for treads and sidewalls, for example.

Tires formed from the rubber composition of the present invention can be produced using the rubber composition by usual methods. Specifically, the unvulcanized rubber composition containing various additives as needed is extruded into the shape of a tire component, e.g. a tread, and then assembled with other tire components in a conventional manner on a tire building machine to build an unvulcanized tire. The unvulcanized tire is heat pressed in a vulcanizer to produce a tire.

In the present invention, pneumatic or non-pneumatic tires can be produced from the rubber composition. Such pneumatic tires can be used, for example, for passenger vehicles, trucks and buses, or two-wheeled vehicles, or as high performance tires. As used herein, high performance tires refer to tires that are excellent particularly in grip performance, including racing tires for racing vehicles. They are excellent in performance on ice and thus suitable as studless winter tires.

EXAMPLES

The present invention will be specifically described with reference to, but not limited to, examples below.

The chemicals used in the examples and comparative examples are listed below.

NR 1: TSR
NR 2: epoxidized natural rubber (NR having epoxy groups in the main chain, degree of epoxidation: 25 mol %) available from Malaysian Rubber Board
BR 1: BR150B (cis content: 97%, vinyl content: 1.5%, Mw/Mn: 3.3) available from Ube Industries, Ltd.
BR 2: modified BR (alkoxysilyl-containing modified high cis BR) prepared in Production Example 1 below
SBR: Buna SL4525-0 (styrene content: 25%, non-oil extended, unmodified S-SBR) available from Lanxess
Silica: ULTRASIL VN3 ($N_2SA$: 175 $m^2/g$) available from Evonik
Carbon black: Diablack N220 ($N_2SA$: 114 $m^2/g$, average primary particle size: 22 nm) available from Mitsubishi Chemical Corporation
Oil: VIVATEC500 available from H&R
C10 resin: NOVARES C10 resin (liquid coumarone-indene resin, softening point: 10° C.) available from Rutger
Stearic acid: product of NOF Corporation
Wax: Ozoace 0355 available from Nippon Seiro Co., Ltd.
Silane coupling agent 1: (2-triethoxysilylethyl)-bis-(7-triethoxysilyl-3,4,5,6-tetrathianonyl)cyclohexane prepared in Production Example 2 below
Silane coupling agent 2: Si69 available from Evonik
Aluminum hydroxide: HIGILITE H-43 (average primary particle size: 1 μm) available from Showa Denko K.K.
Antioxidant: NOCRAC 6C (N-phenyl-N'-(1,3-dimethylbutyl)-p-phenylenediamine) available from Ouchi Shinko Chemical Industrial Co., Ltd.
Zinc oxide: zinc oxide #3 available from HakusuiTech Co., Ltd.
Sulfur: powdered sulfur available from Tsurumi Chemical Industry Co., Ltd.
Vulcanization accelerator 1: NOCCELER NS (N-t-butyl-2-benzothiazolylsulfenamide) available from Ouchi Shinko Chemical Industrial Co., Ltd.
Vulcanization accelerator 2: NOCCELER D (N,N'-diphenylguanidine) available from Ouchi Shinko Chemical Industrial Co., Ltd.

Production Example 1

Preparation of Alkoxysilyl-Containing Modified High Cis BR 2

A 5 L autoclave purged with nitrogen was charged with 2.4 kg of cyclohexane and 300 g of 1,3-butadiene. Then, a catalyst composition (iodine atom/lanthanoid-containing compound molar ratio=2.0) was introduced into the autoclave, and a polymerization reaction was performed for two hours at 30° C. to give a polymer solution. The catalyst composition was previously prepared by reacting and aging a solution of 0.18 mmol of neodymium versatate in cyclohexane, a solution of 3.6 mmol of methylalumoxane in toluene, a solution of 6.7 mmol of hydrogenated diisobutylaluminum in toluene, and a solution of 0.36 mmol of trimethylsilyl iodide in toluene with 0.90 mmol of 1,3-butadiene for 60 minutes at 30° C. To the polymer solution kept at a temperature of 30° C. was added a solution of 1.71 mmol of 3-glycidoxypropyltrimethoxysilane in toluene, and they were reacted for 30 minutes to give a reaction solution. To the reaction solution was added a solution of 1.28 mmol of tetraisopropyl titanate in toluene, followed by stirring for 30 minutes. Then, the polymerization reaction was stopped by adding a solution of 1.5 g of 2,4-di-tert-butyl-p-cresol in methanol. The resultant solution was used as a modified polymer solution (yield: 2.5 kg). To the modified polymer solution was added 20 L of an aqueous solution having a pH of 10 adjusted with sodium hydroxide, followed by removal of the solvent and a simultaneous condensation reaction at 110° C. for two hours. The resulting product was dried using a roll at 110° C. to obtain an alkoxysilyl-containing modified high cis BR 2.

The BR 2 had a cis content of 99%, a vinyl content of 0.2%, and a Mn/Mw of 1.6.

The molecular weight, vinyl content, and cis content of the prepared polymers were analyzed as follows.

<Molecular Weight>

The weight average molecular weight (Mw) and number average molecular weight (Mn) were determined by gel permeation chromatography (GPC) under the following conditions (1) to (8).
(1) Apparatus: HLC-8220 available from Tosoh Corporation
(2) Separation column: HM-H (two in series) available from Tosoh Corporation
(3) Measurement temperature: 40° C.
(4) Carrier: tetrahydrofuran
(5) Flow rate: 0.6 mL/minute
(6) Injection amount: 5 µL
(7) Detector: differential refractometer
(8) Molecular weight standards: polystyrene standards <Identification of Polymer Structure>

The structure of the polymers was identified with a device of JNM-ECA series available from JEOL Ltd. The vinyl content and cis content were calculated from the results.

Production Example 2

Preparation of (2-triethoxysilylethyl)-bis-(7-triethoxysilyl-3,4,5,6-tetrathianonyl)cyclohexane First, (2-trimethoxysilylethyl)divinylcyclohexane was produced by hydrosilylation.

Specifically, a three-neck 5 L round bottom flask equipped with a magnetic stirrer bar, a temperature probe/controller, a heating mantle, an addition funnel, a condenser, and an air inlet was charged with 1,2,4-trivinylcyclohexane (2,001.1 g, 12.3 mol) and VCAT catalyst (1.96 g, 0.01534 g of platinum). Vinyl silane was added while bubbling air by means of the air inlet where a tube was below the surface of the silane. The reaction mixture was heated to 110° C., and trimethoxysilane (1,204 g, 9.9 mol) was added thereto over 3.5 hours. The temperature of the reaction mixture rose up to 130° C. The reaction mixture was cooled to room temperature, and 1,3,5-trimethyl-2,4,6-tris(3,5-di-tert-butyl-4-hydroxybenzyl)benzene (3 g, 0.004 mol) was added thereto. The resulting reaction mixture was distilled at 122° C. and 1 mmHg to give 1,427 g of (2-trimethoxysilylethyl)-divinylcyclohexane. The yield was 51 percent.

Next, (2-triethoxysilylethyl)divinylcyclohexane was produced by transesterification.

Specifically, a three-neck 3 L round bottom flask equipped with a magnetic stirrer bar, a temperature probe/controller, a heating mantle, an addition funnel, a distilling head, a condenser, and a nitrogen inlet was charged with (2-trimethoxysilylethyl)divinylcyclohexane (284 g, 2.33 mol), a solution of sodium ethoxide in ethanol (49 g of 21% sodium ethoxide, Aldrich Chemical), and ethanol (777 g, 16.9 mol). The reaction mixture was heated to remove methanol and ethanol by distillation under atmospheric pressure. The crude product was then distilled under reduced pressure at 106° C. and 0.4 mmHg to give 675 g of (2-triethoxysilylethyl)-divinylcyclohexane. The yield was 89 percent.

Subsequently, (2-triethoxysilylethyl)-bis-(3-thia-4-oxopentyl)cyclohexane was produced by adding thioacetic acid to the divinylsilane.

Specifically, a three-neck 1 L round bottom flask equipped with a magnetic stirrer bar, a temperature probe/controller, a heating mantle, an addition funnel, a condenser, a gas inlet, and a sodium hydroxide scrubber was charged with thioacetic acid (210 g, 2.71 mol). Thereto was slowly added (2-triethoxysilylethyl)divinylcyclohexane (400 g, 1.23 mol) over 30 minutes through the addition funnel at room temperature. The reaction was exothermic, and the temperature of the mixture rose to 94.6° C. The mixture was stirred for 2.5 hours and cooled to 38.8° C. Upon addition of additional thioacetic acid (10 g, 0.13 mol), a slight exothermic reaction was observed. The reaction mixture was stirred at 25° C. overnight (18 hours). An analysis revealed that the reaction mixture contained 2% or less of thioacetic acid and had an overall purity of 91%. The reaction mixture was further purified by distillation under reduced pressure with a Kugelrohr apparatus to obtain (2-triethoxysilylethyl)-bis-(3-thia-4-oxopentyl)cyclohexane.

Furthermore, a dimercaptosilane intermediate [(2-triethoxysilylethyl)bis(2-mercaptoethyl)cyclohexane] was produced by removing acetyl groups from (2-triethoxysilylethyl)-bis-(3-thia-4-oxopentyl)cyclohexane.

Specifically, a three-neck 5 L round bottom flask equipped with a magnetic stirrer bar, a temperature probe/controller, a heating mantle, an addition funnel, a distilling head, a condenser, a 10-plate Oldershaw column, and a nitrogen inlet was charged with (2-triethoxysilylethyl)-bis-(3-thia-4-oxopentyl)cyclohexane (2,000 g, 4.1 mol), ethanol (546.8 g, 11.8 mol), and a solution of sodium ethoxide in ethanol (108 g of a 21% solution of sodium ethoxide in ethanol). The reaction mixture had a pH of about 8. The reaction mixture was heated at 88° C. for 24 hours to remove ethyl acetate and ethanol from the reaction mixture. To the resulting mixture was added 1 L of ethanol twice, and the pH of the reaction mixture was increased to about 10 by addition of 21 g of a 21% solution of sodium ethoxide in ethanol. The reaction mixture was further heated for 6.5 hours. The reaction mixture was cooled and then pressure filtered. The reaction mixture was stripped at 95° C. or lower under a pressure of 1 mmHg. The stripped product was filtered to obtain (2-triethoxysilylethyl)bis-(2-mercaptoethyl)cyclohexane (1,398 g, 3.5 mol, yield: 860).

The target mixture of (2-triethoxysilylethyl)-bis-(7-triethoxysilyl-3,4,5,6-tetrathianonyl)cyclohexane, related oligomers and polysulfides, and bis-(triepoxysilylpropyl)polysulfide was prepared by reacting the dimercaptosilane with a base, sulfur, and 3-chloropropyltriethoxysilane.

Specifically, a three-neck 5 L round bottom flask equipped with a magnetic stirrer bar, a temperature probe/controller, a heating mantle, an addition funnel, a distilling head, a Friedrich condenser, and a nitrogen inlet was charged with (2-triethoxysilylethyl)-bis-(2-mercaptoethyl)cyclohexane (596.3 g, 1.5 mol). A 21% solution of sodium ethoxide in ethanol (979.0 g, 3.0 mol), ethanol (600 g), and sulfur (sublimed powder available from Aldorich Chemical, 299.0 g, 9.1 mol) were added with rapid stirring. The solution was refluxed overnight, and then 3-chloropropyltriethoxysilane (740.0 g, 3.07 mol) was added, followed by refluxing for 16 hours. The resulting solution was cooled and pressure filtered through a 0.1 micrometer filter. The filtrate was then stripped using a Rotavapor to remove ethanol. The target product including (2-triethoxysilylethyl)-bis-(7-triethoxysilyl-3,4,5,6-tetrathianonyl)cyclohexane (1,375 g) was analyzed by HPLC, NMR, and GC.

One isomer of (2-triethoxysilylethyl)-bis-(7-triethoxysilyl-3,4,5,6-tetrathianonyl)cyclohexane has the following structure.

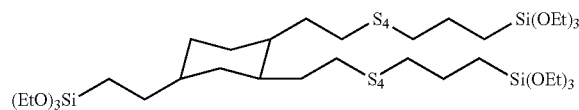

[Examples, Comparative Examples] (Table 1)

The chemicals listed in the Base kneading step 1-1 section in Table 1 in the shown amounts were introduced and kneaded in a Banbury mixer for five minutes at a discharge temperature set at 150° C. Then, the kneadate was maintained in the mixer for one minute so that the discharge temperature reached about 160° C.

Next, the chemicals listed in the Base kneading step 1-2 section in Table 1 in the shown amounts were introduced to the kneadate obtained in base kneading step 1-1 and they were kneaded at 140° C. or higher for 30 seconds, followed by kneading for three minutes so that the discharge temperature reached about 150° C.

Then, to the kneadate obtained in base kneading step 1-2 were added the chemicals listed in the Final kneading step 2 section in Table 1 in the shown amounts, and they were kneaded using an open roll mill at about 80° C. for three minutes to obtain an unvulcanized rubber composition.

The unvulcanized rubber composition was formed into the shape of a tread and assembled with other tire components on a tire building machine, followed by vulcanization at 150° C. and 25 kgf for 35 minutes to prepare a test tire (tire size: 195/65R15).

[Example, Comparative Example] (Table 2)

A test tire was prepared as described above, except that kneading was not carried out in the divided base kneading steps 1-1 and 1-2 but was performed through base kneading step 1 in which the chemicals listed in Table 2 in the shown amounts were introduced at one time, and kneading was conducted for five minutes so that the discharge temperature reached 150° C.

[Evaluation]

The test tires prepared as above were evaluated as follows. Tables 1 and 2 show the results.

<Rolling Resistance>

The rolling resistance of each test tire was measured using a rolling resistance tester by running the test tire mounted on a 15×6 JJ rim at an internal pressure of 230 kPa, a load of 3.43 kN, and a speed of 80 km/h. The rolling resistances are expressed as an index, with Comparative Example 1 set equal to 100. A higher index indicates a better result, i.e. better fuel economy.

<Abrasion Resistance>

Each set of test tires was mounted on a front-engine, front-wheel-drive car made in Japan. After a mileage of 8,000 km, the groove depth in the tire tread portion was measured. The distance at which the tire groove depth decreased by 1 mm was calculated and expressed as an index using the equation below. A higher index indicates better abrasion resistance.

(Abrasion resistance index)=(Distance at which groove depth of each formulation example decreased by 1 mm)/(Distance at which tire groove depth of Comparative Example 1 decreased by 1 mm)×100.

<Grip Performance on Ice>

Each set of test tires was mounted on a front-engine, front-wheel-drive car made in Japan. The test was performed at the Asahikawa Tire Proving Ground (on ice) of Sumitomo Rubber Industries, Ltd. in Hokkaido, Japan. The temperature on ice was −6° C. to −1° C.

Braking performance (Brake stopping distance on ice): The stopping distance on ice was measured which was the distance required to stop after the brakes that lock up were applied at 35 km/h. The results are expressed as an index using the equation below, with Comparative Example 1 set equal to 100. A higher index indicates better braking performance on ice.

(Index of grip performance on ice)=(Stopping distance of Comparative Example 1)/(Stopping distance of each formulation example)×100

TABLE 1

| | | | Example | | | | | Comparative Example | |
|---|---|---|---|---|---|---|---|---|---|
| | | | 1 | 2 | 3 | 4 | 5 | 1 | 2 |
| Amount (parts by mass) | NR 1 | Base kneading step 1-1 | 40 | — | — | — | — | 40 | — |
| | NR 2 | | — | 40 | 40 | 40 | 40 | — | 40 |
| | BR 1 | | 60 | — | — | — | — | 60 | — |
| | BR 2 | | — | 60 | 60 | 60 | 60 | — | 60 |
| | Silica | | 45 | 45 | 45 | 45 | 45 | 45 | 45 |
| | Carbon black | | 5 | 5 | 5 | 5 | 5 | 5 | 5 |
| | Oil | | 20 | 20 | 10 | 10 | 10 | 20 | 20 |
| | C10 resin | | — | — | 10 | 10 | 10 | — | — |
| | Stearic acid | | 2 | 2 | 2 | 2 | 2 | 2 | 2 |
| | Wax | | 2 | 2 | 2 | 2 | 2 | 2 | 2 |
| | Silane coupling agent 1 | | 4.5 | 4.5 | 4.5 | 4.5 | 4.5 | — | — |
| | Silane coupling agent 2 | | — | — | — | — | — | 4.5 | 4.5 |
| | Silica | Base kneading step 1-2 | 25 | 25 | 25 | 25 | 25 | 25 | 25 |
| | Oil | | 10 | 10 | 10 | 10 | 10 | 10 | 10 |
| | Aluminum hydroxide | | — | — | — | 10 | 10 | — | — |
| | Silane coupling agent 1 | | 2 | 2 | 2 | 2 | — | — | — |
| | Silane coupling agent 2 | | — | — | — | — | 2 | 2 | 2 |
| | Antioxidant | | 2 | 2 | 2 | 2 | 2 | 2 | 2 |
| | Zinc oxide | | 2 | 2 | 2 | 2 | 2 | 2 | 2 |

TABLE 1-continued

|  |  |  | Example | | | | | Comparative Example | |
|---|---|---|---|---|---|---|---|---|---|
|  |  |  | 1 | 2 | 3 | 4 | 5 | 1 | 2 |
|  | Sulfur | Final | 1 | 1 | 1 | 1 | 1 | 1 | 1 |
|  | Vulcanization accelerator 1 | kneading | 2 | 2 | 2 | 2 | 2 | 2 | 2 |
|  | Vulcanization accelerator 2 | step 2 | 2 | 2 | 2 | 2 | 2 | 2 | 2 |
| Evaluation | Fuel economy index | | 105 | 112 | 111 | 105 | 108 | 100 | 103 |
|  | Abrasion resistance index | | 109 | 115 | 118 | 104 | 103 | 100 | 102 |
|  | Index of grip performance on ice | | 105 | 107 | 109 | 120 | 118 | 100 | 102 |

TABLE 2

|  |  |  | Example 6 | Comparative Example 3 |
|---|---|---|---|---|
| Amount (parts by mass) | NR 1 | Base | — | — |
|  | NR 2 | kneading | 40 | 40 |
|  | BR 1 | step 1 | — | — |
|  | BR 2 | | 60 | 60 |
|  | Silica | | 70 | 70 |
|  | Carbon black | | 5 | 5 |
|  | Oil | | 20 | 20 |
|  | C10 resin | | — | — |
|  | Stearic acid | | 2 | 2 |
|  | Wax | | 2 | 2 |
|  | Silane coupling agent 1 | | 6.5 | — |
|  | Silane coupling agent 2 | | — | 6.5 |
|  | Sulfur | Final | 1 | 1 |
|  | Vulcanization accelerator 1 | kneading step 2 | 2 | 2 |
|  | Vulcanization accelerator 2 | | 2 | 2 |
| Evaluation | Fuel economy index | | 103 | 98 |
|  | Abrasion resistance index | | 107 | 97 |
|  | Index of grip performance on ice | | 102 | 100 |

The results in Tables 1 and 2 demonstrate that the balance of fuel economy, abrasion resistance, and performance on ice and snow was remarkably improved by adding a silane coupling agent of formula (1) to NR, BR, and silica. In particular, excellent properties were obtained when the base kneading step was divided into base kneading steps 1-1 and 1-2.

[Comparative Example] (Table 3)

Furthermore, test tires with the SBR compounds shown in Table 3 were prepared as in the example and comparative example of Table 2. The test tires were evaluated as described above, and the results (Standard: Comparative Example 5) are shown.

TABLE 3

|  |  |  | Comparative Example | |
|---|---|---|---|---|
|  |  |  | 4 | 5 |
| Amount (parts by mass) | SBR | Base | 70 | 70 |
|  | BR 1 | kneading | 30 | 30 |
|  | Silica | step 1 | 45 | 45 |
|  | Carbon black | | 5 | 5 |
|  | Oil | | 5 | 5 |
|  | C10 resin | | — | — |
|  | Stearic acid | | 2 | 2 |
|  | Wax | | 2 | 2 |
|  | Silane coupling agent 1 | | 6.5 | — |
|  | Silane coupling agent 2 | | — | 6.5 |
|  | Sulfur | Final | 1 | 1 |
|  | Vulcanization accelerator 1 | kneading | 2 | 2 |
|  | Vulcanization accelerator 2 | step 2 | 2 | 2 |
| Evaluation | Fuel economy index | | 103 | 100 |
|  | Abrasion resistance index | | 99 | 100 |
|  | Index of grip performance on ice | | 101 | 100 |

Despite the addition of a silane coupling agent of formula (1), the SBR compound shown in Table 3 exhibited a smaller improvement in the balance of the properties than the NR/BR compound shown in Table 2. This demonstrates that the balance of the properties was synergistically improved by adding a silane coupling agent of formula (1) to NR, BR, and silica.

The invention claimed is:

1. A rubber composition for tires, comprising:
    epoxidized natural rubber;
    polybutadiene rubber;
    silica; and
    a silane coupling agent represented by formula (1) below,
    the epoxidized natural rubber and the polybutadiene rubber being present in amounts of 20% by mass or more and 20% by mass or more, respectively, based on 100% by mass of a rubber component in the rubber composition,
    the silica being present in an amount of 50 parts by mass or more per 100 parts by mass of the rubber component, $$[Y^1R^1S_x\text{—}]_m[G^1(R^2SiX^1X^2X^3)_a]_n[G^2]_o[R^3Y^2]_p \qquad (1)$$

wherein each $G^1$ independently represents a C1-C30 polyvalent hydrocarbon group containing a polysulfide group, represented by $[(CH_2)_b\text{-}]_cR^4[\text{—}(CH_2)_dS_x\text{-}]_e$;
    each $G^2$ independently represents a C1-C30 polyvalent hydrocarbon group containing a polysulfide group, represented by $[(CH_2)_b\text{-}]_cR^5[\text{—}(CH_2)_dS_x\text{—}]_e$;
    each of $Y^1$ and $Y^2$ independently represents a silyl group represented by —$SiX^1X^2X^3$, a hydrogen atom, a carboxyl group, or an ester group represented by —$C(=O)OR^6$;
    each $X^1$ independently represents —Cl, —Br, —OH, —$OR^6$, or $R^6C(=O)O$—;
    each of $X^2$ and $X^3$ independently represents a hydrogen atom, $R^6$, $X^1$, or a —OSi— containing group formed by silanol condensation;
    each of $R^1$ and $R^3$ independently represents a C1-C20 divalent hydrocarbon group;
    each $R^2$ independently represents a linear hydrocarbon group represented by —$(CH_2)_f$—;

each R⁴ independently represents a C1-C28 polyvalent hydrocarbon group or a heteroatom-containing C1-C27 polyvalent hydrocarbon group;

each R⁵ independently represents a C1-C28 polyvalent hydrocarbon group;

R⁶ represents a C1-C20 monovalent hydrocarbon group; and a, b, c, d, e, f, m, n, o, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, o represents a number of 0 to 10, and x represents a number of 1 to 10.

2. The rubber composition for tires according to claim 1, wherein the silane coupling agent of formula (1) is a compound represented by the following formula:

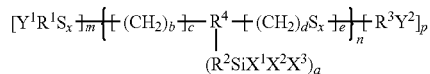

wherein each of Y¹ and Y² independently represents a silyl group represented by —SiX¹X²X³, a hydrogen atom, a carboxyl group, or an ester group represented by —C(=O)OR⁶;

each X¹ independently represents —Cl, —Br, —OH, —OR⁶, or R⁶C(=O)O—;

each of X² and X³ independently represents a hydrogen atom, R⁶, X¹, or a —OSi— containing group formed by silanol condensation;

each of R¹ and R³ independently represents a C1-C20 divalent hydrocarbon group;

each R² independently represents a linear hydrocarbon group represented by —(CH₂)_f—;

each R⁴ independently represents a cyclic alkyl, alkenyl, alkynyl, aryl, or aralkyl group in which a+c+e−1 hydrogen atoms have been replaced;

R⁶ represents a C1-C20 monovalent hydrocarbon group; and a, b, c, d, e, f, m, n, p, and x are independent from one another, each of a, c, and e represents a number of 1 to 3, each of b and d represents a number of 1 to 5, f represents a number of 0 to 5, each of m and p represents a number of 1 to 100, n represents a number of 1 to 15, and x represents a number of 1 to 10.

3. The rubber composition for tires according to claim 1, wherein the polybutadiene rubber contains a functional group reactive with silica.

4. The rubber composition for tires according to claim 1, further comprising at least one selected from the group consisting of sulfide silane coupling agents, liquid coumarone-indene resins, and aluminum hydroxide.

5. A pneumatic tire, formed from the rubber composition according to claim 1.

6. A studless winter tire, formed from the rubber composition according to claim 1.

7. The rubber composition for tires according to claim 3, wherein the epoxidized natural rubber amount is 30% by mass or more and 70% by mass or less, the polybutadiene rubber amount is 40% by mass or more and 70% by mass or less, and the combined amount of the epoxidized natural rubber and polybutadiene rubber is 75% by mass to 100% by mass, and wherein all amounts are based on 100% by mass of the rubber component.

8. The rubber composition for tires according to claim 3, wherein the epoxidized natural rubber amount is 35% by mass or more and 65% by mass or less, the polybutadiene rubber amount is 50% by mass or more and 65% by mass or less, and the combined amount of the epoxidized natural rubber and polybutadiene rubber is 90% by mass to 100% by mass, and wherein all amounts are based on 100% by mass of the rubber component.

9. A pneumatic tire, formed from the rubber composition according to claim 7.

10. A pneumatic tire, formed from the rubber composition according to claim 8.

* * * * *